United States Patent
Yeh et al.

(10) Patent No.: US 8,718,167 B2
(45) Date of Patent: May 6, 2014

(54) METHOD FOR CHANNEL ESTIMATION AND FEEDBACK IN WIRELESS COMMUNICATION SYSTEM

(75) Inventors: Choong il Yeh, Daejeon (KR); Dong Seung Kwon, Daejeon (KR); Jee Hwan Ahn, Daejeon (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 529 days.

(21) Appl. No.: 12/677,412

(22) PCT Filed: Sep. 10, 2008

(86) PCT No.: PCT/KR2008/005350
§ 371 (c)(1),
(2), (4) Date: Mar. 10, 2010

(87) PCT Pub. No.: WO2009/035264
PCT Pub. Date: Mar. 19, 2009

(65) Prior Publication Data
US 2010/0316145 A1    Dec. 16, 2010

(30) Foreign Application Priority Data
Sep. 13, 2007 (KR) .................. 10-2007-0093003

(51) Int. Cl.
*H04B 7/02* (2006.01)
*H04B 1/38* (2006.01)
*H04W 4/00* (2009.01)

(52) U.S. Cl.
USPC ................ 375/267; 375/220; 370/328

(58) Field of Classification Search
USPC .................... 375/150, 267; 330/110
See application file for complete search history.

(56) References Cited

U.S. PATENT DOCUMENTS

2002/0027957 A1 * 3/2002 Paulraj et al. ............ 375/267
2002/0111142 A1 * 8/2002 Klimovitch ............... 455/63
(Continued)

FOREIGN PATENT DOCUMENTS

KR   10-2006-0040180 A   5/2006
KR   10-2006-0127249 A   12/2006
(Continued)

OTHER PUBLICATIONS

Vincent Lau et al., On the Design of MIMO Block-Fading Channels With Feedback-Link Capacity Constraint, IEEE Transactions on Communications, Jan. 1, 2004, vol. 52, No. 1.
(Continued)

*Primary Examiner* — Leon-Viet Nguyen
*Assistant Examiner* — Sarah Hassan
(74) *Attorney, Agent, or Firm* — Jefferson IP Law, LLP

(57) ABSTRACT

Disclosed is a method for channel estimation and feedback in a wireless communication system that estimates a channel for each transmission antenna using an orthogonal frequency division multiplexing (OFDM) impulse signal. A method for channel estimation in a wireless communication system includes causing a base station to generate a training signal with a specific waveform for each transmission antenna and to transmit the generated training signal to terminals; causing the terminals to acquire a downlink channel impulse response for each transmission antenna of the base station using the training signal transmitted from the base station; causing the terminals to acquire a downlink channel characteristic for each transmission antenna of the base station using the acquired channel impulse response; causing the terminal to feed back the acquired downlink channel characteristic information to the base station; and causing the base station to perform fast Fourier transform (FFT) on the downlink channel information transmitted from the terminals to indirectly acquire full channel status information (CSI).

16 Claims, 7 Drawing Sheets

(56) References Cited

U.S. PATENT DOCUMENTS

| | | | | |
|---|---|---|---|---|
| 2002/0176485 A1* | 11/2002 | Hudson | ................ | 375/144 |
| 2003/0017835 A1* | 1/2003 | Bergel | ................ | 455/502 |
| 2003/0060236 A1* | 3/2003 | Kim et al. | ................ | 455/562 |
| 2004/0233872 A1* | 11/2004 | Lobinger et al. | ................ | 370/334 |
| 2005/0002467 A1* | 1/2005 | Seo et al. | ................ | 375/267 |
| 2005/0152263 A1* | 7/2005 | Speth | ................ | 370/203 |
| 2006/0009168 A1* | 1/2006 | Khan et al. | ................ | 455/101 |
| 2006/0153061 A1* | 7/2006 | Nishio | ................ | 370/208 |
| 2007/0041750 A1 | 2/2007 | Mizuta | | |
| 2008/0165677 A1* | 7/2008 | You et al. | ................ | 370/210 |

FOREIGN PATENT DOCUMENTS

| | | |
|---|---|---|
| WO | 2005/094023 A1 | 10/2005 |
| WO | 2007/002305 A2 | 1/2007 |
| WO | 2007/038356 A1 | 4/2007 |

OTHER PUBLICATIONS

Frederick W. Vook et al., Improvements to the Uplink Channel Sounding Signaling for OFDMA, IEEE 802.16 Boradband Wireless Access Working Group, Nov. 18, 2004.

Namseok Chang et al., Impulse Symbol Based Channel Estimation in OFDM Systems, the 17th Annual IEEE International symposium on Personal, Indoor and Mobile Radio Communications, 2006.

* cited by examiner

METHOD FOR CHANNEL ESTIMATION AND FEEDBACK IN WIRELESS COMMUNICATION SYSTEM

TECHNICAL FIELD

The present invention relates to a method for channel estimation and feedback in a wireless communication system.

BACKGROUND ART

Generally, in the downlink closed-loop multiple-input/multiple-output (MIMO) technologies, a base station (BS) should know transmission channel information. For this purpose, the base station needs to support such that mobile stations (MS) can measure downlink channels by transmission antennas of the base station, and the mobile stations need to notify the base station of the measured channels.

At this time, in a closed-loop multiuser-MIMO (MU-MIMO) that requires the transmission channel information, better performance can be achieved when a transmitter acquires full channel status information (CSI) than when it acquires partial CSI of the full channel status information.

However, in order that all of the mobile stations measure the downlink channels by transmission antennas of the base station and the measurement results are fed back to all the base station, an excessive overhead is needed in the downlink and uplink. Accordingly, a partial CSI-based closed-loop MU-MIMO that uses the partial CSI has been widely used while suffering from performance degradation.

In the partial CSI-based closed-loop MU-MIMO, each of the mobile stations feeds back the index of a beam, which is most suitable therefor, among the beams to be used by the base station and a signal-to-noise ratio (SNR) to the base station, instead of the full CSI.

In case of the space division multiple access (SDMA), in which the same spectrum resource is repetitively allocated to multiple mobile stations, the feedback is more complicated. This is because, for SDMA scheduling, the base station should know the interference between beams used by difference mobile stations to which the same spectrum resource is allocated. Particularly, in a wideband communication-based OFDM, since the channel characteristics are different by subcarriers, a more excessive overhead is needed.

The CSI measurement required for the closed-loop MU-MIMO and the feedback of the measured CSI according to the prior art will now be described.

First, a method that uses a MIMO midamble adopted by IEEE 802.16e or the like is known. This method has been most widely used.

According to this method, as shown in FIG. 1, the base station transmits a downlink OFDM symbol with the MIMO midamble, such that the mobile station can determine feedback parameters such as the beam index and the like. FIG. 1 is a diagram illustrating the structure of a MIMO midamble in the related art.

When the subcarrier index used in the OFDM is "i" (where i=0, . . . , N−1), and the number of transmission antennas is 4, the i-th subcarrier is used to transmit a pilot for channel estimation related to the k-th transmission antenna according to Equation 1.

$$i\%4=k \text{ (where } k=0, 1, 2, 3)$$ [Equation 1]

The mobile station measures the channels by transmission antennas using the pilots, which are allocated by transmission antennas, acquires the entire subcarrier channels by interpolation, and determines the beam index and the like using information about the acquired subcarrier channels.

According to the above-described method, each of the mobile stations acquires the full CSI, but feeds back partial CSI of the full CSI to the base station. In this case, however, there is a problem in that one OFDM symbol is always needed.

Second, a method for channel estimation based on an impulse signal is known.

This method is for channel estimation for demodulation, not the MIMO. It has been known that it is practical in view of the pilot overhead and under fast mobile communication.

In addition, this method is an OFDM system that does not use a cyclic prefix (CP). As shown in FIG. 2, a transmitter inserts null periods, between effective OFDM symbols 210, 211, and 212, then correspondingly inserts impulse signals 213 and 214 at the centers of the null periods, and subsequently transmits the effective OFDM symbols 210, 211, and 212 and the impulse signals 213 and 214. At this time, each of null periods is twice as large as the length of a channel impulse response. FIG. 2 is a diagram illustrating a method for channel estimation based on an impulse signal in the prior art.

As shown in FIG. 2, due to the multipath transmission effect, the effective OFDM symbols 210, 211, and 212 are received in the form of received effective OFDM symbols 251, 252, and 253 after having passed through the channel. In addition, the impulse signals 213 and 214 are received in the forms of first impulse received signals 260, 261, and 262 and second impulse received signals 263, 264, and 265, respectively.

According to this method, since impulse signal transmission power for transmitting the impulse signals 213 and 214 is set to be larger than effective OFDM symbol transmission power for transmitting the effective OFDM symbols 210, 211, and 212, the channel impulse response is easily measured by the mobile station. In addition, the mobile station may acquire the channel estimation value with respect to each subcarrier by transforming on the channel impulse response by fast Fourier transform (FFT).

According to the above-described method, however, when the impulse signals (213 and 214 shown in FIG. 2) are transmitted with power that is larger than that of the effective OFDM symbols (210, 211, and 212 shown in FIG. 2) for data transmission, the value of a peak-to-average power ratio (PAPR) is increased, and a large capacity power amplifier is needed, which causes an increase in cost.

Most of the wireless communication systems use a band pass filter to follow the regulation of electrical radiation, which is defines so as to not interfere with other wireless communication systems or neighboring radio channels. The impulse signal transmission power is distributed in all of the bands.

Thereby, when the band pass filter is not used, the impulse signals strongly interfere with other wireless communication systems and neighboring communication channels. Meanwhile, when the band pass filter is used, power distributed in the bands other than the channel band may be lost, and the impulse signals may be distorted. Accordingly, it is actually difficult for the mobile station to measure the channel impulse response using the impulse signals.

Due to the two above-described reasons, it is difficult to apply the method for channel estimation using the impulse signals to a real system.

As such, in the related art, at the beginning of the introduction of the OFDM technology, a technique that inserts a null guard interval (GI) between the effective OFDM symbols in order to eliminate inter-symbol interference (ISI) has been used. In this case, however, there is a difficulty in the OFDM symbol timing recovery, and performance degradation is caused by the inter-carrier interference (ICI) in the OFDM symbol.

DISCLOSURE OF INVENTION

Technical Problem

The present invention implements a method of transmitting a training signal and measuring a channel impulse response that can effectively measure and report channel status information at a transmitter (CSIT) in an OFDM closed-loop MU-MIMO.

Technical Solution

An exemplary embodiment of the present invention provides a method for allowing a terminal to perform channel estimation in a base station of a wireless communication system. The method includes generating a training signal with a specific waveform for each transmission antenna such that the terminal can measure a downlink channel, and transmitting the training signal to the terminal, and receiving downlink channel information from the terminal, and performing fast Fourier transform (FFT) to indirectly acquire full channel status information (CSI).

The training signal may be an orthogonal frequency division multiplexing (OFDM) impulse signal having an effective OFDM signal and a cyclic prefix (CP). When the length of a channel impulse response is shorter than the effective OFDM impulse signal, a rear part of the effective OFDM impulse signal may be copied and used as the CP, while when the length of the channel impulse response is longer than the effective OFDM impulse signal, the effective OFDM impulse signal may be repeatedly used as the CP.

The OFDM impulse signal may have an orthogonal characteristic such that the transmission antennas are distinguished from each other when being transmitted with the same time resource by the individual transmission antennas. The CP may be determined depending on the length of the channel impulse response. The downlink channel information may include a path-based channel value and an inter-path propagation delay, which are measured with the OFDM impulse signal on the terminal side.

The method may further include performing the FFT downlink channel information feedback from the terminal to directly calculate downlink full CSI and an expected carrier-to-interference and noise ratio (CINR).

Another embodiment of the present invention provides a method for channel estimation and feedback in a terminal of a wireless communication system. The method includes receiving a training signal with a specific waveform from a base station and acquiring a downlink channel impulse response for each transmission antenna in a base station, and acquiring a downlink channel characteristic for each transmission antenna on the basis of the acquired channel impulse response.

The acquiring of the downlink channel impulse response may include checking peak signals by a waveform correlator and acquiring an inter-path delay using a time interval between the checked peak signals, and acquiring the path-based channel value that is output at the time of checking the peak signals.

The acquiring of the downlink channel characteristic may include feeding back the acquired inter-path delay and path-based channel value from the terminal to the base station to perform the FFT and to estimate a channel of all of subcarriers for each transmission antenna.

The method may further include feeding back the acquired downlink channel characteristic information to the base station.

The feeding back to the base station may include reporting the path-based channel value and the inter-path propagation delay, which are obtained by the waveform correlator. That is, the terminal reports the path-based channel value and the inter-path propagation delay, which are obtained by the waveform correlator, to the base station as they are.

Still another embodiment of the present invention provides a method for channel estimation and feedback in a wireless communication system. The method includes: causing a base station to generate a training signal with a specific waveform for each transmission antenna and to transmit the generated training signal to a terminal; causing the terminal to acquire a downlink channel impulse response for each transmission antenna of the base station on the basis of the training signal transmitted from the base station; causing the terminal to acquire a downlink channel characteristic for each transmission antenna of the base station on the basis of the acquired channel impulse response; causing the terminal to feed back the acquired downlink channel characteristic information to the base station; and causing the base station to perform FFT on the downlink channel information fed back from the terminal to indirectly acquire full CSI.

BRIEF DESCRIPTION OF THE DRAWINGS

An exemplary embodiment of the present invention will be described in detail with reference to the accompanying drawings for clear understanding of advantages of the present invention, wherein.

MODE FOR THE INVENTION

Figure 1:
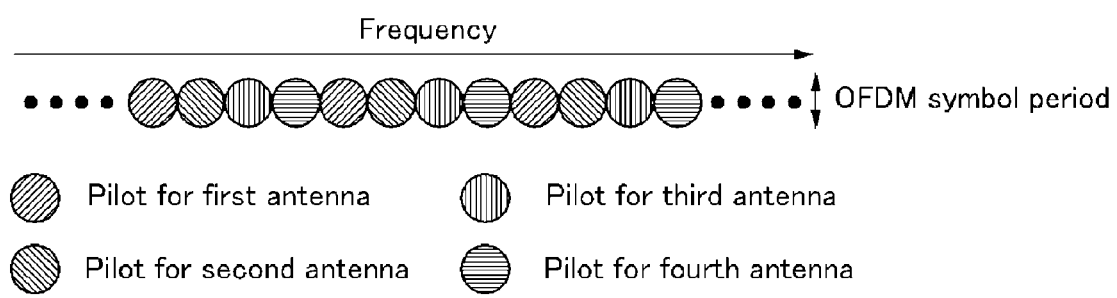
FIG. 1 is a diagram illustrating the structure of a MIMO midamble in the prior art.
Figure 2:
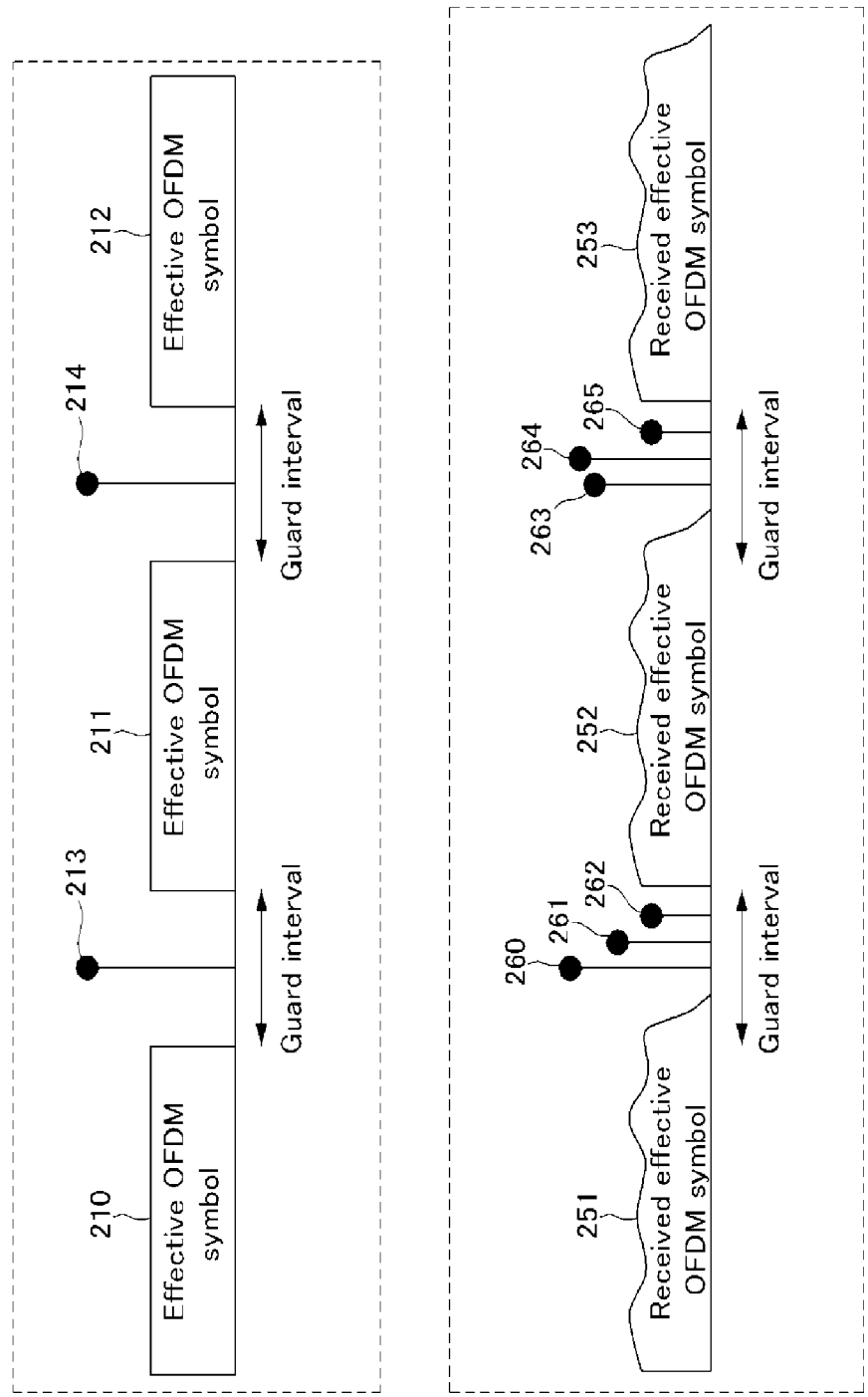
FIG. 2 is a diagram illustrating a method for impulse signal-based channel estimation in the prior art.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations, such as "comprises" or "comprising", will be understood to imply the inclusion of stated elements but not the exclusion of any other elements. The term "section", "-er (-or)", or "module" used herein mean a unit that processes at least one function or operation. This can be implemented by hardware, software, or a combination thereof.

In this specification, a mobile station (MS) may refer to a terminal, a mobile terminal (MT), a subscriber station (SS), a portable subscriber station (PSS), user equipment (UE), or an access terminal (AT). The mobile station may include all or part of the functions of the mobile station, the subscriber station, the portable subscriber station, and the user equipment.

In this specification, a base station (BS) may refer to an access point (AP), a radio access station (RAS), a node B, a base transceiver station (BTS), or a mobile multihop relay base station (MMR-BS). The base station may include all or part of the functions of the access point, the radio access station, the node B, the base transceiver station, and the MMR-BS.

A method for channel estimation in a wireless communication system according to an exemplary embodiment of the present invention will now be described in detail with reference to FIG. 3 to FIG. 7.

Figure 3:
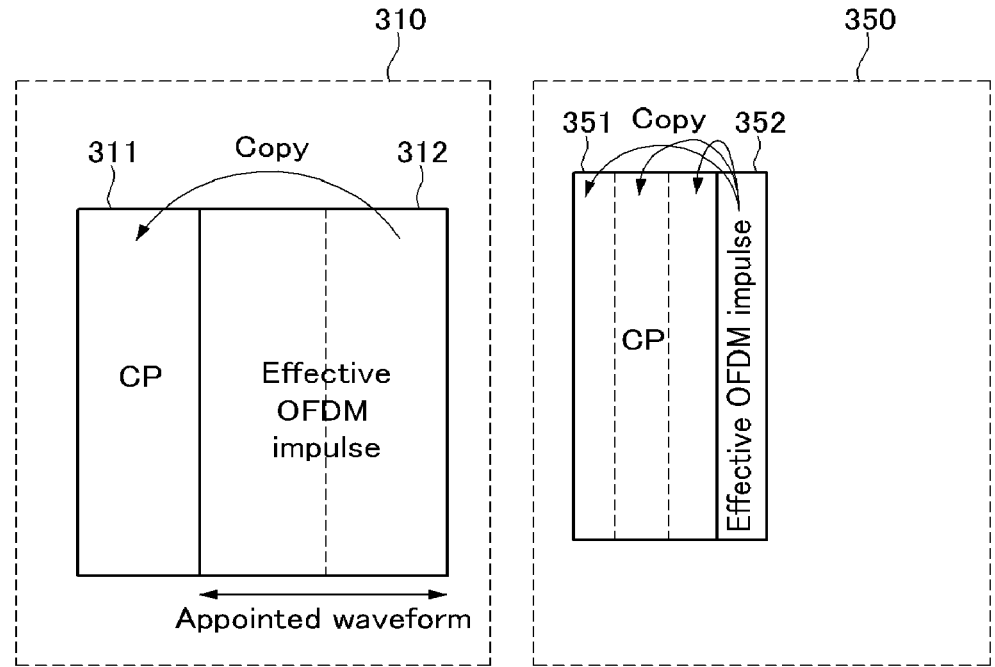
FIG. 3 is a diagram showing the structure of an OFDM impulse signal according to an exemplary embodiment of the present invention.
Figure 4:
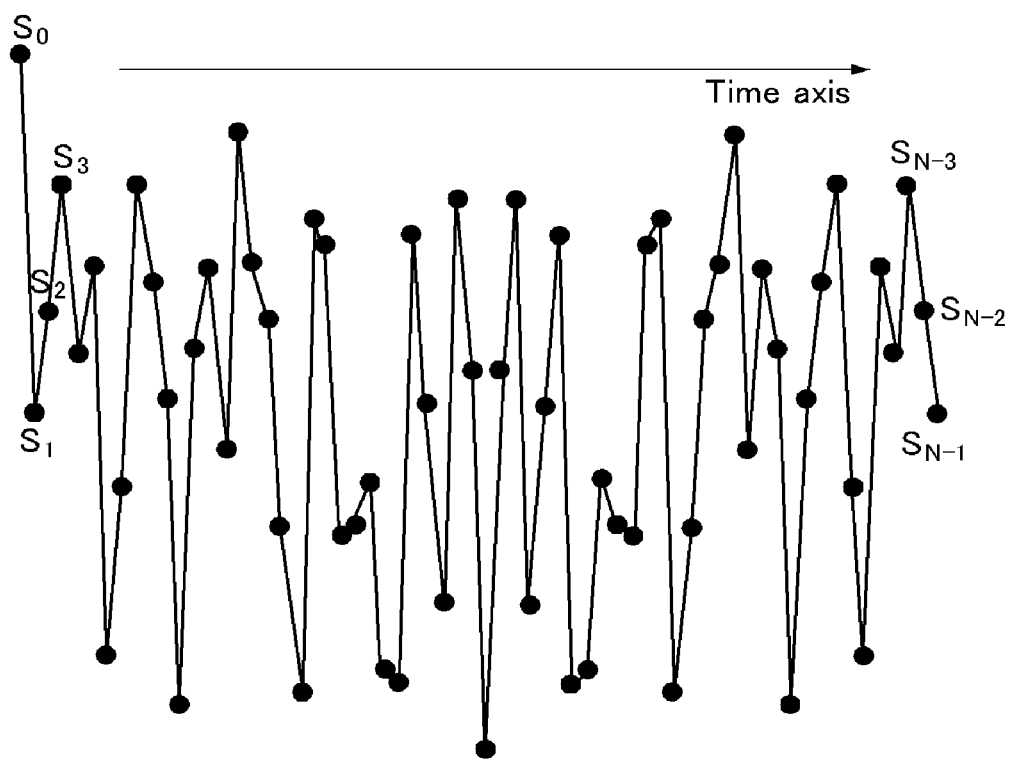
FIG. 4 is a diagram showing the waveform of an effective OFDM impulse signal, according to an exemplary embodiment of the present invention.
Figure 5:
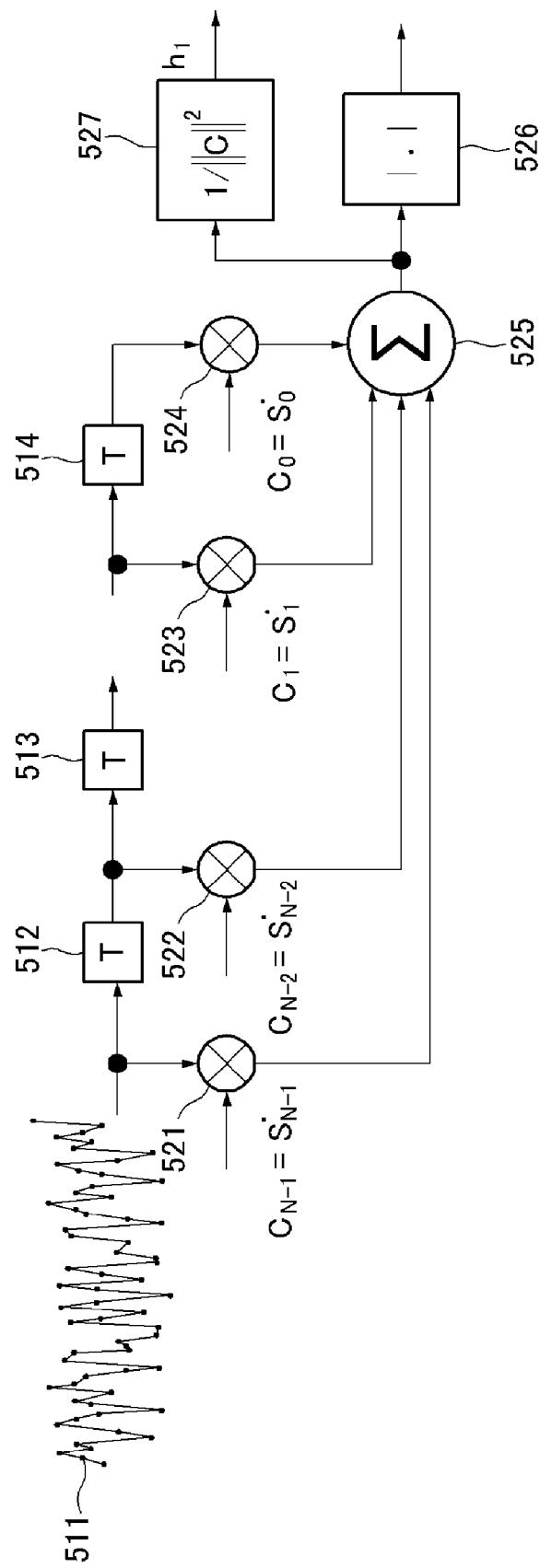
FIG. 5 is a diagram showing a waveform correlator according to an exemplary embodiment of the present invention.
Figure 6:
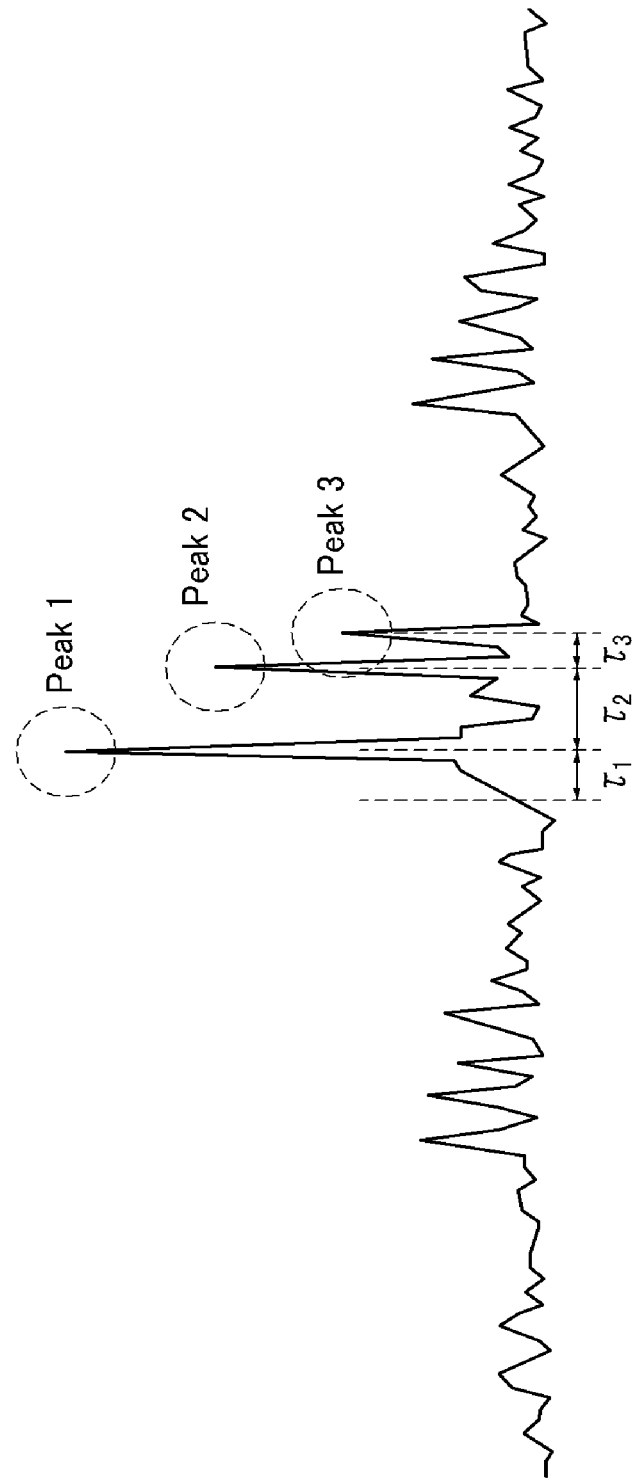
FIG. 6 is a diagram showing the output waveform of an absolute calculator in a waveform correlator according to an exemplary embodiment of the present invention.
Figure 7:
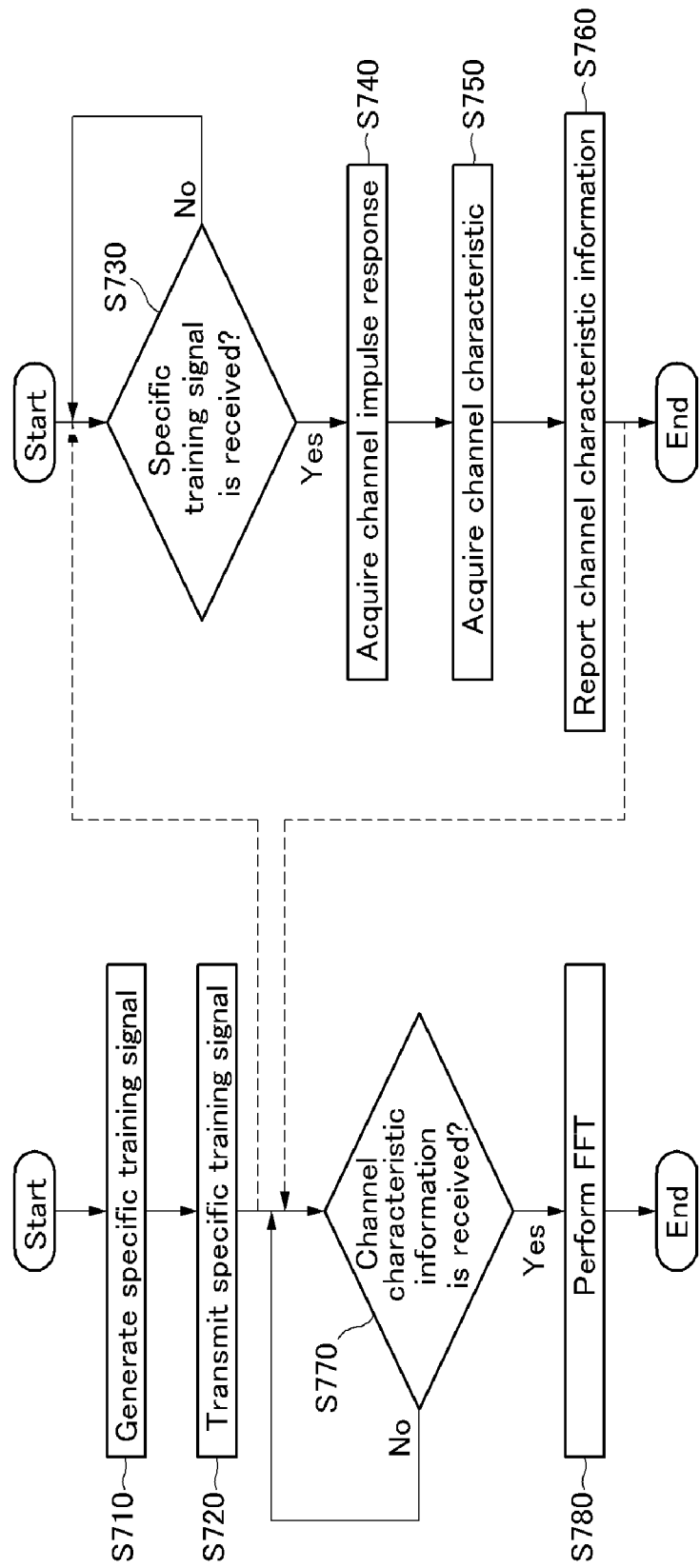
FIG. 7 is a flowchart illustrating a method for channel estimation in a wireless communication system according to an exemplary embodiment of the present invention.

FIG. 3 is a diagram showing the structure of an OFDM impulse signal according to an exemplary embodiment of the present invention. FIG. 4 is a diagram showing the waveform of an effective OFDM impulse signal according to an exemplary embodiment of the present invention. FIG. 5 is a diagram showing a waveform correlator in a terminal according to an exemplary embodiment of the present invention. FIG. 6 is a diagram showing the output waveform of the absolute value calculator shown in FIG. 5 when three propagation paths are present. FIG. 7 is a flowchart illustrating a method for channel estimation in a wireless communication system according to an exemplary embodiment of the present invention.

A method for channel estimation in a wireless communication system according to an exemplary embodiment of the present invention uses a short OFDM symbol (hereinafter, referred to as "OFDM impulse signal") with an appointed waveform.

Referring to FIG. 3 and FIG. 4, an OFDM impulse signal according to an exemplary embodiment of the present invention will be described. An OFDM symbol 310 or 350 according to an exemplary embodiment of the present invention includes, as shown in FIG. 3, a cyclic prefix (CP) 311 or 351 and an effective OFDM impulse signal 312 or 352. The OFDM impulse signal 310 or 350 is a general OFDM symbol that has the same characteristics as those of an OFDM symbol.

As shown in FIG. 3, the OFDM impulse signal 310 is the OFDM impulse signal when the length of a channel impulse response is shorter than an effective OFDM impulse signal 312. In addition, the OFDM impulse signal 350 is the OFDM impulse signal when the length of the channel impulse response is longer than the effective OFDM impulse signal 352.

The CP 311 of the OFDM impulse signal 310 is generated by copying a rear part of the effective OFDM impulse signal 312.

The CP 351 of the OFDM impulse signal 350 is generated by copying the effective OFDM impulse signal 353 several times.

At least one terminal may measure a channel for each transmission antenna using the OFDM impulse signal 310 or 350 according to an exemplary embodiment of the present invention. In this case, the OFDM impulse signal 310 or 350 has an appointed waveform, and thus all of the terminals recognize the waveform.

FIG. 4 schematizes the waveform of the effective OFDM impulse signal, which is transmitted from a transmitter (i.e., base station). Here, since the waveform of the effective OFDM impulse has an appointed waveform, all of receivers (i.e., terminals) may recognize the waveform. In this case, the receivers recognize "$S_i$; i=0, 1, 2, . . . , N−1". Here, "$S_i$" represents the time-variant waveform of the effective OFDM impulse signal, which is recognized by all of the terminals.

When the OFDM impulse signal reaches the receiver through an i-th path, if the channel of the i-th path is "$h_i$", a waveform 511 is input to a waveform correlator of the receiver, that is, a terminal, as shown in FIG. 5. The waveform 511 represents the waveform of the effective OFDM impulse signal, which is received through the i-th propagation path having a channel characteristic "$h_i$".

The waveform correlator in FIG. 5 is used to measure a downlink impulse response for each transmission antenna.

Referring to FIG. 5, the waveform correlator according to an exemplary embodiment of the present invention includes a plurality of delay elements 512, 513, and 514, a plurality of complex number multipliers 521, 522, 523, and 524, a complex number adder 525, an absolute value calculator 526, and a divider 527, which performs division by the norm of a vector constituted from a waveform sample. In FIG. 5, a reference character 'T' denotes a sampling period.

Since the receiver (i.e., terminal) recognizes the waveform of the effective OFDM impulse signal, it may measure a channel impulse response by the waveform correlator shown in FIG. 5.

In a case that the waveform is correlated with a signal to be received through the i-th path, when a peak is observed at the output of the absolute value calculator 526, the output of the divider 527 becomes a channel value of the corresponding path.

Referring to FIG. 6, at a time when "Peak 1", "Peak 2", and "Peak 3" are output from the absolute value calculator 526, the channel values of the corresponding paths are output from the divider 527. In addition, in FIG. 6, an inter-path delay may be obtained from a distance between the peaks.

Accordingly, the terminal obtains a delay and a channel value of each path. For this reason, by performing fast Fourier transform (FFT) on the obtained delay and channel value, the channel values of all of subcarriers is measured. In addition, the delay and channel values are fed back to the base station, such that the base station directly acquires full CSI through the FFT. In this case, feedback overhead is significantly reduced.

A method for channel estimation in a wireless communication system according to an exemplary embodiment of the present invention will now be described with reference to FIG. 7.

As shown in FIG. 7, first, the base station generates a specific training signal such that the terminal may measure a downlink channel for each transmission antenna of the base station (S710).

In step S710, when the terminal measures the downlink channel using the FFT based on the channel impulse response in an OFDM communication system, the base station generates the OFDM impulse signal shown in FIG. 3 so as to support the downlink channel measurement in the terminal.

In this case, the OFDM impulse signal is constituted from, as shown in FIG. 3, an effective OFDM impulse signal having a variable length so as to improve the length of the channel impulse response and measurement performance of the channel impulse response in the terminal. In addition, when a plurality of transmission antennas of the base station in the downlink closed-loop MIMO transmit the OFDM impulse signals using the same time resource, respectively, the OFDM impulse signals have an orthogonal characteristic such that the antennas are distinguished from each other.

Next, the base station transmits the OFDM impulse signal generated in step S710 through the plurality of transmission antennas to the terminal (S720). That is, the base station transmits a training signal with a specific waveform for each antenna, such that the terminal measures a downlink channel for each transmission antenna of the base station.

In this case, as shown in FIG. 3, the base station determines the CP of each OFDM impulse signal in consideration of the length of the channel impulse response. Referring to FIG. 3, the length of the effective OFDM impulse signal is related to the channel estimation performance. Accordingly, if the length of the effective OFDM impulse signal is extended, the channel estimation performance in the terminal is improved.

When the transmission antennas of the base station transmit the OFDM impulse signals using the same time resource, each of the antennas uses a training signal having a substantially orthogonal characteristic. Thereby, the terminal distinguishes the transmission antennas of the base station using the waveform correlator shown in FIG. 5. In this case, when the plurality of transmission antennas share the same time resource, it is necessary to use a long effective OFDM impulse signals in order to improve the channel estimation performance in the terminal.

Next, the terminal receives the specific training signal from the base station (S730), and acquires a downlink channel impulse response for each transmission antenna of the base station on the basis of the received specific training signal (S740). In this case, when the terminal acquires the channel impulse response on the basis of the OFDM impulse signals shown in FIG. 3, which are transmitted from the base station, the waveform correlator having the structure shown in FIG. 5 is used.

The waveform correlator acquires the channel path delay on the basis of the time interval between the peak signals output from the absolute value calculator 526 shown in FIG. 5. In addition, at the time when the peak is output from the absolute value calculator 526 shown in FIG. 5, the waveform correlator acquires the channel value corresponding to each path using a function "$1/\|c\|^2$" of the divider 527 shown in FIG. 5.

Next, the terminal acquires a downlink channel characteristic for each transmission antenna of the base station on the basis of the channel impulse response acquired in step S740 (S750). That is, the terminal estimates the time interval between the peak signals, which are output from the absolute value calculator 526 shown in FIG. 5.

Subsequently, the terminal feeds backs and reports information about the acquired downlink channel characteristic to the base station (S760). In this case, to reduce the feedback overhead, the terminal directly reports, to the base station, the path-based channel value and the inter-path propagation delay, which are collected by the waveform correlator shown in FIG. 5.

Specifically, the fact that the terminal directly feeds back the channel value per subcarrier to the base station means that the terminal directly reports, to the base station, the path-based channel value and the inter-path propagation delay, which are collected by the waveform correlator shown in FIG. 5.

Next, the base station receives the downlink channel information, which is fed back from the terminal (S770). In this case, when the path-based channel value and the inter-path propagation delay are directly reported to the base station in step S760, the base station performs the FFT on the reported path-based channel value and inter-path propagation delay to indirectly acquire the full CSI with a reduced feedback overhead (S780).

In addition, the base station performs the FFT on the reported path-based channel value and inter-path propagation delay to directly calculate downlink full CSI and an expected carrier-to-interference and noise ratio (CINR). Then, the full CSI and the expected CINR is used for MIMO applications and scheduling. In addition, an uplink overhead required for downlink channel feedback transmission is reduced.

According to an exemplary embodiment of the present invention, the OFDM impulse signal to be transmitted from the base station is implemented as shown in FIG. 3, such that the terminal measures the channel impulse response while all of the merits in the OFDM signal system is maintained. In addition, the waveform correlator shown in FIG. 5 is implemented, such that the terminal measures the channel impulse response on the basis of the OFDM impulse signal.

If the method for channel estimation in a wireless communication system according to an exemplary embodiment of the present invention is applied, the channel CSI feedback is effectively provided.

For the downlink closed-loop MIMO, the base station requires the downlink channel information. In this case, the terminal transmits the measured downlink channel information to the base station using an uplink feedback channel. At this time, the terminal may report partial or full CSI to the base station.

When the full CSI is used, the performance of the downlink closed-loop MIMO is improved, but the feedback overhead is increased. As the partial CSI, a beam index, a CINR, and the like is used. Even if the partial CSI is used, in case of an OFDM, to which a band selection concept is applied, independent partial CSI is needed per band, which results in an increase in the feedback overhead. Particularly, when the SDMA is applied, feedback is much more complicated. This is because the base station needs to recognize interference between beams used by different terminals, to which the same spectrum resource is allocated, for SDMA scheduling.

A method for channel estimation that causes the receiver to measure the channel impulse response and perform spectrum analysis has been known in the related art. However, it has not been known that the receiver feeds back the measured channel impulse response to the transmitter, the transmitter performs spectrum analysis on the channel impulse response to acquire the full CSIT, and uses the acquired full CSIT in the closed-loop MIMO. The IEEE 802.16e standard clearly states a method for direct feedback of an individual channel value, but it does not state the feedback of the channel impulse response including the time delay.

Next, a method for channel value feedback according to an exemplary embodiment of the present invention will be described with reference to FIG. 8.

Figure 8:
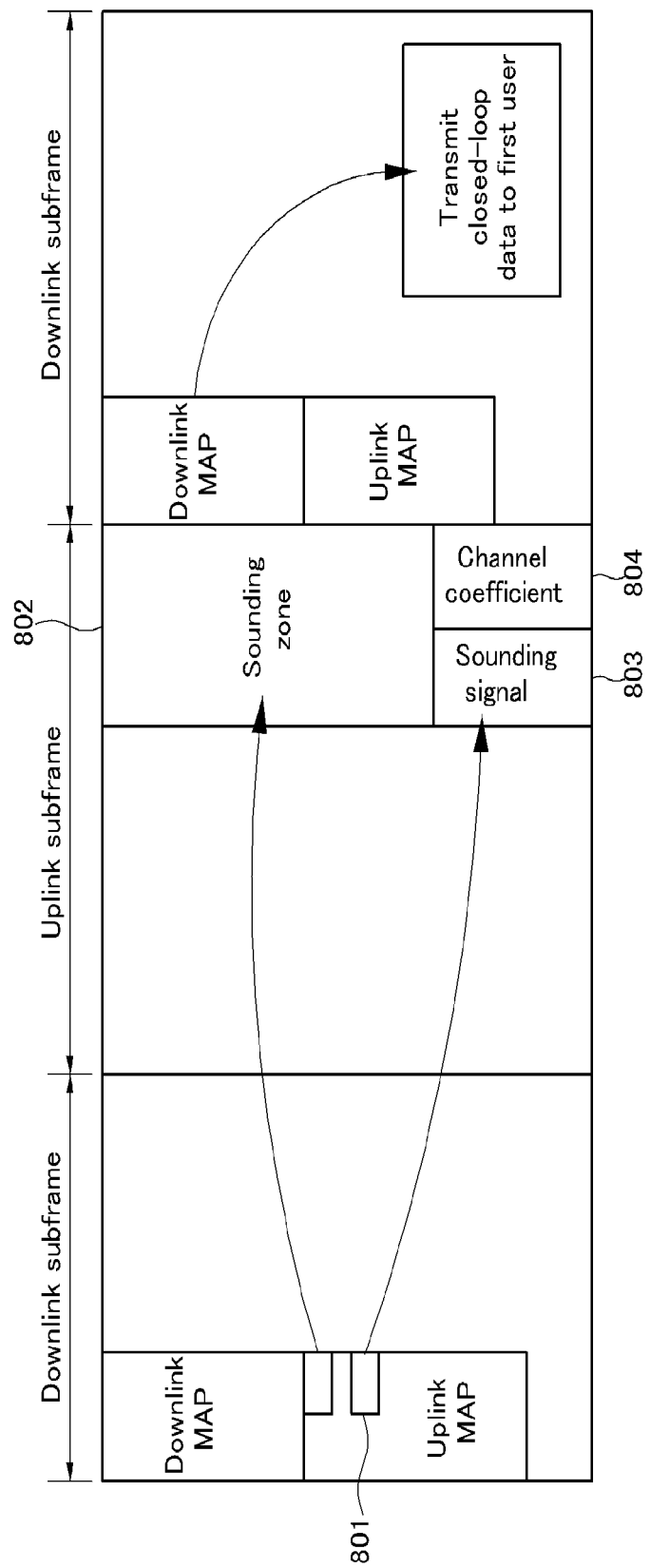
FIG. 8 is a diagram illustrating a method for channel value feedback in a terminal according to an exemplary embodiment of the present invention.

FIG. 8 is a diagram illustrating an operation of a terminal to directly feed back a channel value to a base station for the closed-loop MIMO according to the IEEE 802.16e standard in a method for channel value feedback according to an exemplary embodiment of the present invention.

In the IEEE 802.16e standard, the base station instructs the terminal to directly transmit a channel coefficient using an uplink sounding command 801 (e.g., UL_Sounding_Command_IE) shown in FIG. 8. In this case, the uplink sounding command 801 includes a channel coefficient.

This may be used when the terminal does not have a calibration function in the frequency division duplex (FDD), which cannot use channel reciprocity.

In this case, the terminal directly transmits, to the base station, an estimated downlink channel coefficient (reference numeral "804" of FIG. 8) subsequently to a sound signal 803 using a sounding zone 802. The sounding signal 803 is not used by the base station for the closed-loop MIMO, but it is used for coherent demodulation of the channel coefficient 804 to be transmitted from the terminal.

Meanwhile, it can be understood that, when the terminal directly reports to the base station, the path-based channel value and the inter-path propagation delay, which are collected by the waveform correlator shown in FIG. 5, and the base station performs the FFT thereon, the base station can indirectly acquire the full CSI with a reduced feedback overhead. In addition, the CINR can be directly calculated to be used for scheduling.

The exemplary embodiment of the present invention has illustrated a method of transmitting a training signal and measuring a channel impulse response that can effectively measure and report the CSIT in the OFDM closed-loop MU-MIMO.

According to the embodiments of the present invention, channel estimation performance of the terminal can be improved using a long effective OFDM impulse signal. In addition, the path-based channel value and the inter-path propagation delay, which are collected by the terminal, are directly reported to the base station, and the base station performs the FFT thereon to directly calculate the full CSI and the expected CINR. Then, the full CSI and the expected CINR can be used for MIMO applications and scheduling. Furthermore, an uplink overhead required for downlink channel feedback transmission can be reduced.

The embodiment of the present invention described above is not be implemented by only the method and apparatus, but it may be implemented by a program for executing the functions corresponding to the configuration of the exemplary embodiment of the present invention or a recording medium having recorded thereon the program. These implementations can be realized by the ordinarily skilled person in the art from the description of the above-described exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for allowing a terminal to perform channel estimation in a base station of a wireless communication system, the method comprising:
    generating a training signal with a specific waveform for each transmission antenna such that the terminal measures a downlink channel impulse response for each transmission antenna, and transmitting the training signal to the terminal; and
    causing the base station to receive downlink channel information that relates to a downlink channel measured based on the downlink channel impulse response from the terminal, and to perform fast Fourier transform (FFT) to indirectly acquire full channel status information (CSI),
    wherein the training signal is an orthogonal frequency division multiplexing (OFDM) impulse signal having an effective OFDM signal and a cyclic prefix (CP), and
    wherein, when the length of a channel impulse response is shorter than the effective OFDM impulse signal, a rear part of the effective OFDM impulse signal is copied and used as the CP.

2. The method of claim 1, wherein, when the length of the channel impulse response is longer than the effective OFDM impulse signal, the effective OFDM impulse signal is repeatedly used as the CP.

3. A method for allowing a terminal to perform channel estimation in a base station of a wireless communication system, the method comprising:
    generating a training signal with a specific waveform for each transmission antenna such that the terminal measures a downlink channel impulse response for each transmission antenna, and transmitting the training signal to the terminal;
    causing the base station to receive downlink channel information that relates to a downlink channel measured based on the downlink channel impulse response from the terminal, and to perform fast Fourier transform (FFT) to indirectly acquire full channel status information (CSI); and
    performing the FFT on the downlink channel information that is fed back from the terminal to directly calculate downlink full CSI and an expected carrier-to-interference and noise ratio (CINR),
    wherein the downlink channel information comprises a path-based channel value and an inter-path propagation delay, which are measured with an Orthogonal Frequency Division Multiplexing (OFDM) impulse signal on the terminal side, and wherein the performing of the FFT on the downlink channel information comprises estimating a channel of all of subcarriers for each transmission antenna.

4. A method for channel estimation and feedback in a terminal of a wireless communication system, the method comprising:
    receiving, from a base station, training signals with a specific waveform for a plurality of transmission antennas of the base station and acquiring a downlink channel impulse response for each transmission antenna of the base station; and
    acquiring a downlink channel characteristic for each transmission antenna on the basis of the acquired channel impulse response,
    wherein the acquiring of the downlink channel impulse response comprises:
        checking peak signals by a waveform correlator and acquiring an inter-path delay using a time interval between the checked peak signals; and
        acquiring the path-based channel value, which is output at the time of checking the peak signals, and
    wherein the acquiring of the downlink channel characteristic comprises feeding back the acquired inter-path delay and path-based channel value from the terminal to the base station to perform the Fast Fourier transform (FFT) and estimate a channel of all of subcarriers for each transmission antenna.

5. A method for channel estimation and feedback in a terminal of a wireless communication system, the method comprising:

receiving, from a base station, training signals with a specific waveform for a plurality of transmission antennas of the base station and acquiring a downlink channel impulse response for each transmission antenna of the base station;

acquiring downlink channel characteristic information for each transmission antenna on the basis of the acquired channel impulse response; and feeding back the acquired downlink channel characteristic information to the base station, wherein the feeding back to the base station comprises reporting a path-based channel value and an inter-path propagation delay, which are obtained by a waveform correlator to the base station, and wherein the base station performs Fast Fourier Transform (FFT) based on the path-based channel value and the inter-path propagation delay to estimate a channel of all of subcarriers for each transmission antenna.

6. The method of claim 3, wherein the training signal is an OFDM impulse signal having an effective OFDM signal and a Cyclic Prefix (CP).

7. The method of claim 6, wherein, when the length of the channel impulse response is shorter than the effective OFDM impulse signal, a rear part of the effective OFDM impulse signal is copied and used as the CP.

8. The method of claim 6, wherein, when the length of the channel impulse response is longer than the effective OFDM impulse signal, the effective OFDM impulse signal is repeatedly used as the CP.

9. The method of claim 5, wherein the training signals are Orthogonal Frequency Division Multiplexing (OFDM) impulse signals having an effective OFDM signal and a Cyclic Prefix (CP).

10. The method of claim 9, wherein, when the length of the channel impulse response is shorter than the effective OFDM impulse signal, a rear part of the effective OFDM impulse signal is copied and used as the CP.

11. The method of claim 9, wherein, when the length of the channel impulse response is longer than the effective OFDM impulse signal, the effective OFDM impulse signal is repeatedly used as the CP.

12. A terminal for channel estimation and feedback in a wireless communication system, the terminal comprising:
a waveform correlator configured to acquire a downlink channel impulse response for each transmission antenna of a base station based on training signals with a specific waveform for a plurality of transmission antennas of the base station,
wherein downlink channel characteristic information for each transmission antenna on the basis of the acquired channel impulse response is reported to the base station to perform Fast Fourier Transform (FFT) and estimate a channel of all of subcarriers for each transmission antenna, and
wherein the downlink channel characteristic information comprises a path-based channel value and an inter-path propagation delay.

13. The terminal of claim 12, wherein the waveform correlator comprises:
an absolute value calculator configured to determine peak signals when a transmission waveform is correlated with a signal to be received through an i-th path; and
a divider configured to obtain the path-based channel value, which is output at the time of determining the peak signals,
wherein the inter-path delay is obtained by using a time interval between the determined peak signals.

14. The terminal of claim 12, wherein each training signal is an Orthogonal Frequency Division Multiplexing (OFDM) impulse signal having an effective OFDM signal and a Cyclic Prefix (CP).

15. The terminal of claim 14, wherein, when the length of the channel impulse response is shorter than the effective OFDM impulse signal, a rear part of the effective OFDM impulse signal is copied and used as the CP.

16. The terminal of claim 14, wherein, when the length of the channel impulse response is longer than the effective OFDM impulse signal, the effective OFDM impulse signal is repeatedly used as the CP.

* * * * *